Sept. 16, 1930.    O. HASELOFF    1,775,999

SELF ADJUSTABLE VALVE

Filed Sept. 18, 1929

Otto Haseloff
INVENTOR

BY
his ATTORNEY

Patented Sept. 16, 1930

1,775,999

UNITED STATES PATENT OFFICE

OTTO HASELOFF, OF NEW YORK, N. Y.

SELF-ADJUSTABLE VALVE

Application filed September 18, 1929. Serial No. 393,355.

This invention relates to valves and it particularly relates to self adjustable valves, the object of the invention being to provide means by which a conduit for any fluid, whether it be a liquid or a gas, may be opened or closed in an absolutely reliable manner.

It is a further object of the invention to provide such opening and closing means in the form of a self adjustable valve which will be low priced in cost and which is even more economical than the valves of the prior art in its operation because none of its parts will require repairs for the reason that unusual and unnecessary strains on the valve parts are avoided wherefore, except for the limited resistance of metallic materials, repairs of the valve will be practically avoided.

My new self adjustable valve is also highly economical in its operation because it cuts down the expense of time, labor and the losses by service interruptions necessitated by regrinding or renewing valve seats, etc., because my new self adjustable valve closes at any time even if the valve seat is not properly machined and hangs to one side or the other.

In the assembling of valves, faulty valve bodies are easily detected if the seat ring has a crack through which a liquid or a gas can leak, or if the seat ring has upwardly extending projections which would not allow the valve disk to properly and fully sit upon the seat ring. Very much experience and great care is required to discover a valve having a seat ring which is not properly disposed in a horizontal plane, but is slanting sidewise so that the stem, arranged perpendicularly to the plane of the seat ring, will rest only on one side of the seat ring and will leave open a crescent shaped slot through which the fluid, passing through the conduit, may escape.

All these defects are avoided by my new adjustable valve.

With these and other objects in view, which will be more apparent from the description below as I describe my invention by citing the valve illustrated in the accompanying drawing, as an example in which my invention is embodied.

Figure 1:
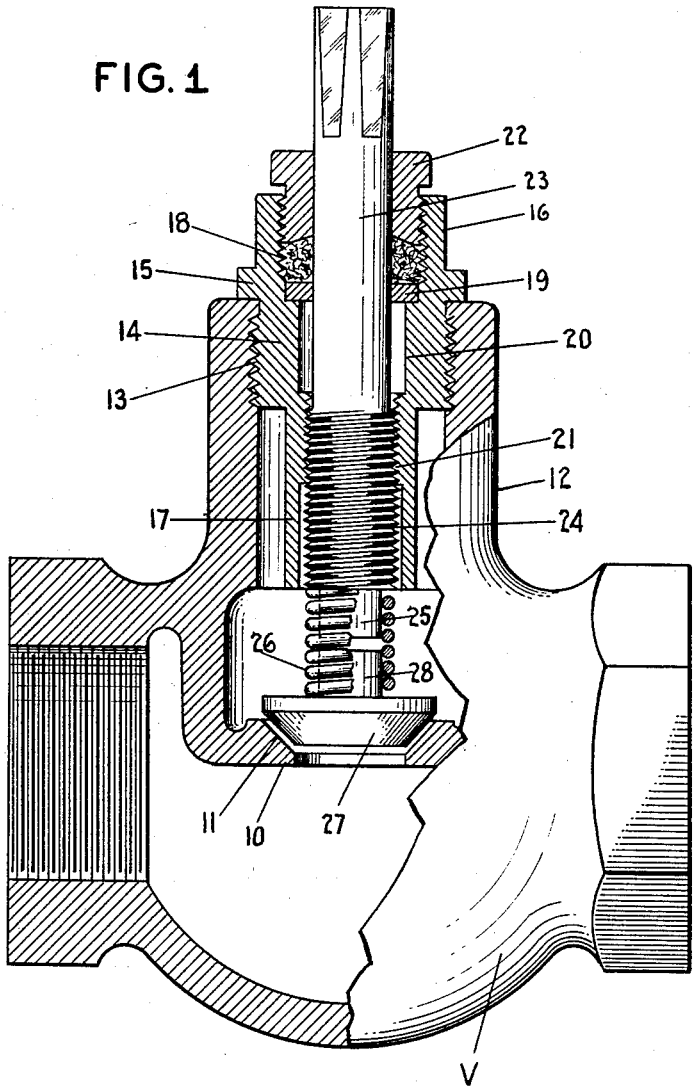
Figure 2:
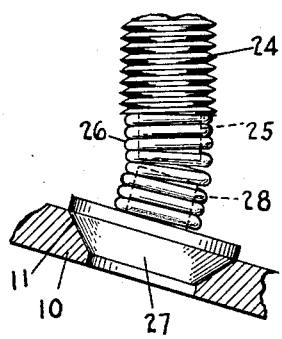

In the accompanying drawing, Figure 1 is a front elevation of one valve containing my new invention, part of the outside shell being broken away to disclose the valve seat and stem in relation to each other and parts of the stem also being broken away so as to disclose certain features of my invention more thoroughly, and Figure 2 is a detail view showing the position of the head of my new valve on a sidewise slanting seat ring.

In the accompanying drawing the letter V denotes a body of a valve usually known as a globe valve, in which the seat 10 is centrally arranged in a substantially horizontal plane, the seat ring 11 being of any suitable surface, for instance having the shape of an inverted V.

The valve neck 12 is provided inside with a female thread which engages the outside male thread 13 of a bushing 14 having a plate like rim 15, which closes the opening of the neck, and a six cornered nut-shaped terminal 16 is superimposed upon said rim 15.

The bushing 14 ends in a lower terminal 17 in the form of a tube of somewhat smaller outside diameter than the male thread 13. The bushing 14 is provided inside with bores of various widths arranged downward in step-wise fashion. The upper nut-shaped terminal 16 is provided at its inside with a female thread 18 going down to about the plane in which the outside male thread ends where a rim is provided upon which a perforated washer 19 may be arranged. The part of the bushing provided at its outside with the male thread 13 is provided inside with a smooth cylindrical wall 20 going as far down as to the beginning of the lower terminal tube 17 which is provided with a raised female thread 21 to about the middle of its length.

A gland 22 provided with a male thread on its outside engages the female thread of the nut-shaped terminal 18.

Centrally and perpendicularly through aforesaid gland and bushing 22 and 18 and the valve seat 10 a stem 23 is arranged, said stem being flattened at its top so as to engage a turning wheel (not shown) and near its lower end it is provided with a raised male thread 24 engaging aforesaid raised female thread 21 within the lower terminal tube 17. The stem 23 terminates in a stud 25 over which a coil spring 26 is tightly fitted. Coaxially with said stem 23 and centrally above the valve seat 10 is arranged a downwardly tapering valve disk 27, which has on top a centrally arranged, upwardly projecting stem or cylindrical nipple, 28, which like the stud 25, is tightly inserted into the coil 26, but from below, leaving an interstice between stud 25 and stem 28.

The coil 26 is made of elastic, non-corrosive steel.

The valve is provided with packing material of the usual kind and in the usual manner.

The operation of the valve is in every respect the same as that of any other valve with this difference, however, which is brought about by the action of the coil spring encircling the stud 25 and the stem 28, which difference is in fact, the essence of the present invention. Assuming that the valve illustrated is wide open, and that therefore the valve disk 27 is above the seat ring 11, it is obvious that owing to the tight fit of the coil 26 upon the stud 25, the coil is moved downwardly as soon as the stem 23 is turned so as to move downwardly. As soon as the valve disk 27 comes to rest on the seat ring 11 the said disk may be pressed upon the same until a further compression of the coil 26 is no longer possible.

As soon as this particular state is reached the further turning of the stem 23 is useless for this turning has the effect on the coil 20 that it slightly widens so that the stud 25 slides within the coil 26 without pressing the valve disk tighter on the seat ring 11. This sliding of the stud 25 in the coil 26 becomes so obvious to the operator of the valve because, contrary to the difficulty entailed by the tightening of the old style valve, the stem suddenly turns with an unusual ease which in fact is used as an indication to the operator that the valve is now closed.

If the valve is closed and must be opened the stem 23 is turned in the usual way with the result that the coil spring 26 tightens immediately upon the stud 25 and the nipple 28, so that the grip thus obtained upon them causes the valve disk to follow the upward movement of the stem 23, thereby opening the valve.

This action of the coil spring 26 on turning the stem 23 in an opening or closing direction is the same regardless of whether the dimensions of the valve and its parts, essential for my invention, are of large or small dimensions.

Figure 2 shows the relation of the valve disk to the seat ring 11 in case the same is not properly machined, or part of the same is slanting. An inspection of this figure shows that the valve disk 27 self-centers itself under the elastic pressure exerted upon it by the coil spring 26 and that the seat ring 11 is covered all around its periphery, whereas in the valves of the prior art the valve disk sits only on the high part of the seat ring and a gap, causing the valve to leak, is formed on the side towards which the seat ring is slanting.

It is understood that for the coil spring 26 may be substituted any other similar flexible means having the property of widening when the stem 23 is turned after closing the valve and of tightening its grip on the stud 25 and the stem 28 when the valve is opened.

What I claim is:

1. In a valve the combination with a valve body of any of the usual types, of a stem adapted to operatively engage aforesaid valve body and terminating at its lower end in a stud of smaller diameter than that of the stem, a valve disk having an upwardly projecting nipple terminating just below aforesaid stud, and flexible means co-operatively engaging aforesaid stud and nipple, said means releasing its grip on the stud after the valve is closed and tightening its grip on both the stud and nipple when the valve is opened.

2. In a valve the combination with a valve body of any of the usual types, of a stem, a screw threadedly engaging the thread of aforesaid valve body, a stud at the lower end of the stem, of smaller diameter than that of the screw thread of the stem, a valve disk having a circular nipple terminating just below aforesaid stud, and an expansion coil spring cooperatively encircling aforesaid stud and nipple, said coil releasing its grip on the stud after the valve is closed and tightening its grip on both the stud and nipple when the valve is opened.

3. In a valve the combination with a valve body of any of the usual types, of a stem centrally arranged in aforesaid valve body perpendicularly above its centrally located seat ring and provided with a screw thread operatively engaging the screw thread of aforesaid valve-body, a stud at the lower end of the stem, of smaller diameter than that of the screw thread of the stem, a valve disk having a cylindrical nipple terminating just below aforesaid stud, and an expansion coil spring co-operatively encircling aforesaid stud and nipple, said coil releasing its grip on the stud after the valve is closed and tightening its grip on both the stud and nipple when the valve is opened.

4. As a new article of manufacture a self adjustable valve, said valve consisting of valve body of any of the usual types and having as its essential parts a stem, which has at its lower part a screw thread adapted to operatively engage aforesaid valve-body and having below its screw thread a stud of smaller diameter than that of the screw thread, a plate disk with a nipple terminating just below aforesaid stud and an expansion coil spring encircling both the stud and nipple, said coil releasing its grip on the stud after the valve is closed and tightening its grip on both the stud and nipple when the valve is opened.

In witness whereof I have hereunto set my hand.

OTTO HASELOFF.